(12) United States Patent
Hanada et al.

(10) Patent No.: US 7,441,959 B2
(45) Date of Patent: Oct. 28, 2008

(54) BEARING MECHANISM FOR SPINDLE MOTOR IN MAGNETIC DISK DRIVE

(75) Inventors: Kazuyoshi Hanada, Kanagawa (JP); Masaru Muranishi, Kanagawa (JP); Yuji Ishima, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 336 days.

(21) Appl. No.: 11/312,986

(22) Filed: Dec. 19, 2005

(65) Prior Publication Data

US 2006/0133707 A1 Jun. 22, 2006

(30) Foreign Application Priority Data

Dec. 22, 2004 (JP) ............................. 2004-370508

(51) Int. Cl.
*F16C 33/38* (2006.01)
*G11B 21/02* (2006.01)

(52) U.S. Cl. ..................... 384/523; 384/526; 360/99.08
(58) Field of Classification Search ................. 384/523, 384/526, 572, 580; 192/45; 360/99.08, 98.07
See application file for complete search history.

(56) References Cited

U.S. PATENT DOCUMENTS 3,913,993 A * 10/1975 Ernst ........................ 384/513
5,667,312 A * 9/1997 Grunze et al. ............... 384/450
6,302,588 B1 * 10/2001 Brown ....................... 384/461
6,394,656 B1 * 5/2002 Williams ................... 384/450
6,435,325 B1 * 8/2002 Miller et al. ................. 192/45

FOREIGN PATENT DOCUMENTS

JP 2000-105983 4/2000

* cited by examiner

*Primary Examiner*—Thomas R Hannon
(74) *Attorney, Agent, or Firm*—Townsend and Townsend and Crew LLP; Darren Gold

(57) ABSTRACT

Embodiments of the invention prevent trouble caused by an increase in viscosity of grease generated when a ball bearing operates at a low temperature, and fretting that an inner ring and/or an outer ring comes in contact with balls to produce wear when vibration is applied thereto. In one embodiment, a ball bearing is configured such that a plurality of balls are arranged between an outer ring and an inner ring. Grease is filled between the balls, the inner ring and the outer ring. A holder is provided with a spring plate, and an extreme end thereof is always in contact with the balls. The spring plate is formed of a sufficiently softer material than the balls so as not to damage the balls. The mounted direction is one along the direction in which the balls are desired to be rotated. Appropriate spring pressurization can be applied to the balls at an angle defined by the holder and the spring plate in the root at which the holder is attached to the spring plate.

20 Claims, 8 Drawing Sheets

BEARING MECHANISM FOR SPINDLE MOTOR IN MAGNETIC DISK DRIVE

CROSS-REFERENCES TO RELATED APPLICATIONS

This application claims priority from Japanese Patent Application No. JP2004-370508, filed Dec. 22, 2004, the entire disclosure of which is incorporated herein by reference.

BACKGROUND OF THE INVENTION

The present invention relates to a magnetic disk drive. More specifically, the invention relates to a bearing mechanism for a carriage which supports a magnetic head for rotation, and a bearing mechanism for a spindle motor which supports a magnetic disk for rotation.

Conventionally, the magnetic disk drive (hereinafter referred to as HDD) includes a ball bearing that is disposed between a carriage hub and a rotational center shaft of the carriage hub. The carriage hub supports a magnetic head for magnetically recording and reproducing information on a magnetic disk. A ball bearing is also used between a rotating shaft of a spindle motor for rotating a magnetic disk and a fixed shaft. Two ball bearings are provided up and down of a rotating shaft in terms of the basic using method. For these ball bearing, an outer ring or an inner ring is rotated with a plurality of balls disposed between the inner ring and the outer ring. Each ball is held by a holder such that each space between the balls is made constant, and grease is filled between the balls and the inner and outer rings in order to provide smooth rotation. A shield is provided for covering a portion of the holder over the inner ring and outer ring so that the grease is not scattered.

Patent Document 1 (Japanese Patent Laid-Open No. 2000-105983) describes a technique of forming a lubricating oil film in a rolling bearing for a rotating shaft used in information apparatuses. In that disclosure, to reduce a variation in rotational torque at a low speed rotation generated due to stirring resistance of grease or lubricating oil, ester lubricating oil whose dynamic viscosity at 40° C. is 25 to 150 $mm^2/s$ is dropped on the frictional surface of the rolling bearing, or the surface is subjected to oil plating to form a lubricating oil film.

BRIEF SUMMARY OF THE INVENTION

Conventionally, an HDD is often used as an external storage device for a server, and installed in an exclusive-use room where an air conditioner is installed. Even in mobile use, the environment for use in HDDs is in the range usable by human beings, and the environmental conditions in use are prepared. However, further miniaturization, larger capacity, higher speed, and lower cost of the devices have been achieved recently. As a result, the environment in use becomes so severe that it is used in the conditions that have never been contemplated so far, for example, in automobiles. The using temperature range required for use in HDDs is normally, 0 to 60° C. in those mounted on the personal computers, and −30 to 85° C. in those mounted on the automobiles. In particular, for the environment of low temperature equal to or less than 0° C., if the viscosity of grease of the bearing becomes large and the carriage repeatedly rocks in the range where a rotational angle thereof is relatively small, then the grease in the rocked range becomes lean by the repeatedly passing ball, and the collected portion thereof is moved to the turn back portion. Repetition of the operation only in this range of the carriage poses no problem. However, when the carriage intends to operate over the allowable rocking range, the ball will cross over the hill of grease so far formed. At this time, a large resistance is generated with respect to the rotating force of the carriage.

An HDD generally learns the external force generated with respect to the rocking of the carriage at fixed intervals, and sets a current value for energizing a coil of a voice coil motor (VCM) used to move the carriage for rotation to a desired position. When the large resistance is generated in rotation of the carriage due to the aforementioned phenomenon, a current required therefor exceeds the current value set by the aforementioned learning. As a result, the rotation and movement of the carriage is not completed within the fixed time. The HDD issues an alarm indicating an abnormal state of time-out, resulting in stop or reckless run of the carriage. If the rotation of the magnetic disk stops in that state where the magnetic head flies above the magnetic disk, the magnetic head stops on the surface of the magnetic disk while being attracted thereto, resulting in a serious problem.

Further, there is a problem that so-called fretting wear may occur. To be more specific, when devices do not operate under transportation but a positional relation between the ball and the inner ring or outer ring is always the same, vibration is applied to the devices because they are stacked on the transporting truck, whereby the inner ring and/or the outer ring comes in contact with the balls to cause wear therebetween, which is called fretting wear.

A feature of the present invention is to solve the aforementioned conventional problem by providing a mechanism of making the ball harder to rotate in a specific direction than in the other direction on a portion of the bearing with where the ball comes in contact with the inner ring or the outer ring.

A magnetic disk drive according to an aspect of the present invention includes: an information storing magnetic disk; a spindle motor used for supporting the magnetic disk on a rotating shaft to rotate the magnetic disk; a magnetic head for recording or reproducing information on the magnetic disk; a pivot hub for supporting the magnetic head through a suspension; a rotational center shaft serving as the rotational center of the pivot hub; and a ball bearing provided between the rotational center shaft and the pivot hub and provided with a mechanism for making balls hard to rotate in a specific direction.

The ball bearing has a holder for limiting spaces defined by the balls, and the mechanism for making balls hard to rotate in a specific direction is provided on the holder, the mechanism being a spring plate to come into contact with the ball.

In some embodiments, the spring plate is formed of a material which is softer than the balls. The spring plate applies pressurization to the ball. The ball bearing has a holder for limiting spaces defined by the ball, and the mechanism for making balls hard to rotate in a specific direction may be provided on the holder, the mechanism being a bush having a plurality of spring plates to come into contact with the balls.

Preferably, the ball bearings are provided on both ends of the rotational center shaft, and the direction in which the balls are hard to rotate is opposite for both ends of the rotational center shaft.

A magnetic disk drive according to another embodiment of the present invention includes: an information storing magnetic disk; a rotating shaft for supporting the magnetic disk; a fixed shaft serving as the rotational center of the rotating shaft; a ball bearing provided between the fixed shaft and the rotating shaft and provided with a mechanism for making balls hard to rotate in a specific direction; and a magnetic head for recording or reproducing information on the magnetic disk.

The ball bearing has a holder for limiting spaces defined by the balls, and the mechanism for making balls hard to rotate in a specific direction is provided on the holder, the mechanism being a spring plate to come into contact with the ball.

In some embodiments, the spring plate is formed of a material which is softer than the balls. The spring plate applies pressurization to the balls. The ball bearing has a holder for limiting spaces defined by the balls, and the mechanism for making balls hard to rotate in a specific direction may be provided on the holder, the mechanism being a bush having a plurality of spring plates to come into contact with the balls. The ball bearings are provided on both ends of the rotating shaft, and the direction in which the balls are hard to rotate is the same for both ends of the rotating shaft.

According to the present invention, it is possible to prevent trouble caused by the viscosity increase of grease of a ball bearing generated at a low temperature. Further, it is possible to prevent so-called fretting wear that vibration is applied to devices while they are stacked on a transporting truck, whereby the inner ring and/or the outer ring comes in contact with the ball to produce wear.

BRIEF DESCRIPTION OF THE DRAWINGS

FIG. 14 is a partial perspective view of the holder shown in FIG. 9.

DETAILED DESCRIPTION OF THE INVENTION

Figure 6:
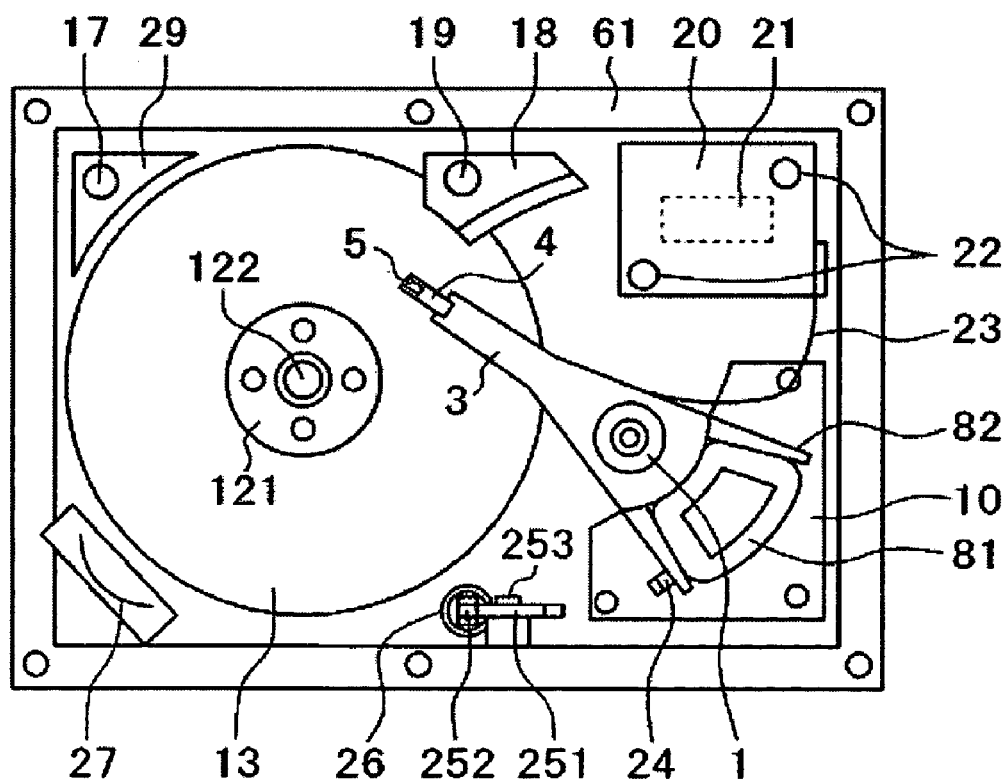
FIG. 6 is a top plan view of a magnetic disk drive for which a ball bearing is used according to an embodiment of the present invention.
Figure 7:
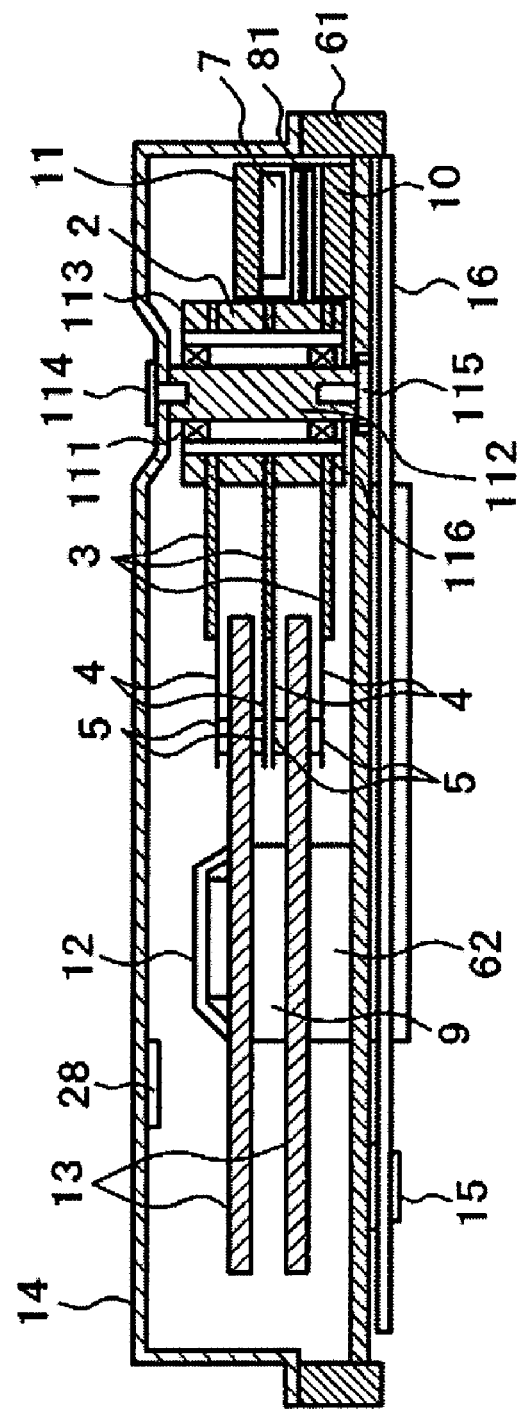
FIG. 7 is a sectional view of the magnetic disk drive shown in FIG. 6.

First, the basic structure of HDD will be described referring to FIGS. 6 and 7. A magnetic disk 13 includes a magnetic film formed on the surface of a glass or an aluminum substrate, and records and stores information therein. The magnetic disk 13 is mounted on a rotating shaft of a spindle motor 62 for rotating the magnetic disk 13 at high and constant speed with good accuracy, and is fixed to the rotating shaft by a screw 122 through an aluminum or iron or stainless clamp 121. A magnetic head 5 includes a slider flying with a space of a few nano-millimeters above the rotating magnetic disk 13 and an electromagnetic transducer element for recording and reproducing information on the magnetic disk 13. The magnetic head 5 is held by adhesion or soldering on a suspension 4 formed of aluminum, iron, or stainless, and stably flies above the magnetic disk 13 while keeping a constant space.

A head arm 3 formed of aluminum, iron, magnesium, or stainless supports the suspension 4. The head arm 3 is supported by a pivot bearing 1 to transfer the magnetic head 5 above the magnetic disk 13. The pivot bearing 1 includes a rotational center shaft 112 formed of stainless, aluminum, or iron, and a pivot hub 113 formed of iron, stainless, or aluminum provided through a ball bearing 111 on both ends of the rotational center shaft 112. To drive the head arm 3 for rotation, a VCM including a permanent magnet 7 provided by adhesion on a lower yoke 10 and/or an upper yoke 11 formed of stainless or iron is provided on a base 61. A coil 81 having a lead wire wound and molded is arranged in a gap between the lower yoke 10 and the permanent magnet 7. A coil spacer 82 formed of iron, stainless, or aluminum having the head arm 3 and the coil 81 adhered thereto is fixed by screws or adhesion to the pivot arm 113 by a nut 116 laminated on the pivot hub 113 and formed of iron, stainless, or aluminum.

An assembly which rotates about the rotational center shaft 112 is called a carriage. This is designed to be well balanced so that with the rotational center shaft 112 as an inertia center, no unevenness occurs in the rotating force of the carriage even at any angle the HDD is placed, or the carriage does not move even if shocks are applied. An electrical signal of the magnetic head 5 is transmitted to a lead wire (not shown) fixed to the head arm 3 by adhesion, caulking, or fitting, or to FPC (Flexible Print Substrate). The electric signal of the magnetic head 5 is further transmitted therefrom to an HDD connector 21 to locations other than HDD through a read/write PCB (printed circuit board) 20 having a read/write amplifier (not shown) for controlling a signal of the magnetic head 5. A power supply for the coil 81 is similarly connected to the HDD connector 21. The read/write PCB (printed circuit board) 20 is fixed to the base 61 by one or more screws 22.

Some HDDs are provided with the plurality of magnetic disks 13 for increased capacity. In that case, since each magnetic head 5 is present in the surface of each magnetic disk 13, a disk spacer 9 formed of iron, stainless, or aluminum is disposed between the magnetic disks 13, while an arm spacer 2 formed of iron, stainless, or aluminum is disposed between the head arms 3 to keep spaces there with good accuracy.

The spindle motor 62 and the rotational center shaft 112 are fixed to the base 61 formed of aluminum, magnesium, iron, or stainless with good accuracy of their positional space. The spindle motor 62 is fixed by a screw or fitting adhesion (not shown), and the rotational center shaft 112 of the carriage is fixed by a screw 114 and a screw 115.

The magnetic head 5 in an HDD is generally unloaded from the magnetic disk 13 except when operation for recording or reproducing information on the magnetic disk 13 is required so that information on the magnetic disk 13 is not broken by shocks from outside or collision of the magnetic head 5. At this time, the magnetic head 5 is held in the state that an extreme end of the suspension 4 is inserted into a slope-like groove molded on the side of a ramp 18 formed of a plastic provided on the base 61 by a screw 19 or adhesion fixing, and slidably moved to keep a space so as not to produce an interference between the magnetic heads 5. A catch portion 24 formed of plastic, aluminum, magnesium, iron, or stainless provided on the spacer 82 is caught on a latch lever 251 formed of a plastic to fix the carriage, whereby the magnetic head 5 is not disengaged from the ramp 18. The latch lever 251 is provided, by adhesion or fitting, with a latch magnet 252 of a permanent magnet on the side opposite the portion for catching the carriage. The latch lever 251 is bored with a hole and is rotatably fixed to the inner surface of the base 61 by a pin 253. The latch lever 251 pulls the latch magnet 252 and rotates by energizing a latch coil 26. It is designed so that when not energized, the latch lever is moved away due to the inertia balance.

In the HDD, a cover 14 formed of iron, stainless, aluminum, or brass is provided to keep a tight close relative to the base 61 so that operation of recording or reproducing information is not obstructed due to the intervention of dust or the like between the magnetic head 5 and the magnetic disk 13. A filter 27 for capturing dust floating in the closed area is provided by fitting or adhesion in a groove molded in the base 61. An active carbon 29 for adsorbing vapor moving into the HDD through a suction filter 28 fixed by a screw or adhesion to the cover 14 for adsorbing corrosive gas or shutting out dust coming from outside air is provided by the screw 17 or adhesion fitting with the base 61. A closed body closed by the base 61 and the cover 14 is called an enclosure.

A signal of the magnetic disk 5 within the enclosure and a current of the coil 81 are transmitted to a main PCB (printed circuit board) 16 having a glass epoxy laminated and having a number of elements soldered for controlling the device by HDD connector 21 formed of plastic, iron, stainless, aluminum, or brass. A current for driving the spindle motor 62 and a current of the latch coil 26 are similarly transmitted to the main PCB (printed circuit board) 16. The main PCB (printed circuit board) 16 is fixed by the screw 15 or adhesion to the base 61.

Figure 8:
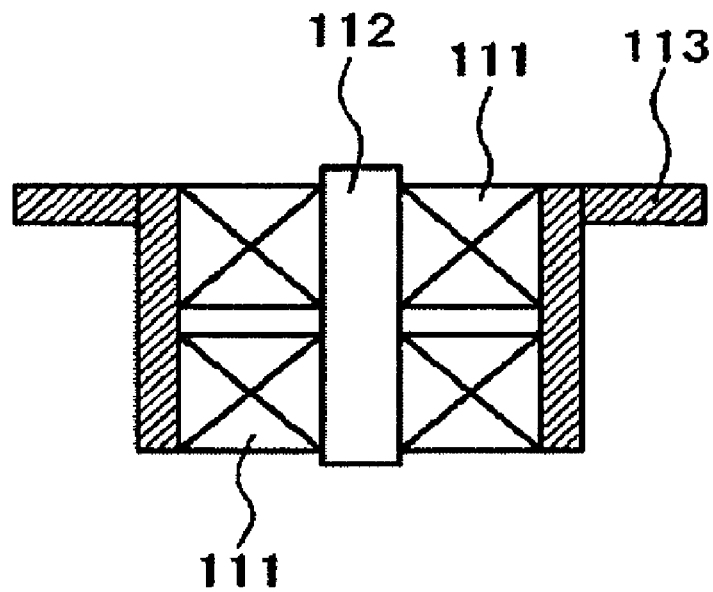
FIG. 8 is a view showing the mounted state of the ball bearing.

The detail of the ball bearing incorporated into the carriage will be described hereinafter with reference to FIGS. 8 to 14. FIG. 8 shows a state where the rotational center shaft 112, the ball bearing 111, and the pivot hub 113 are mounted. The structures provided between the pivot hub 113 and the ball bearing 111 and between the rotational center shaft 112 and the ball bearing 111 are assembled by press fitting or both press fitting and adhesion.

Figure 9:
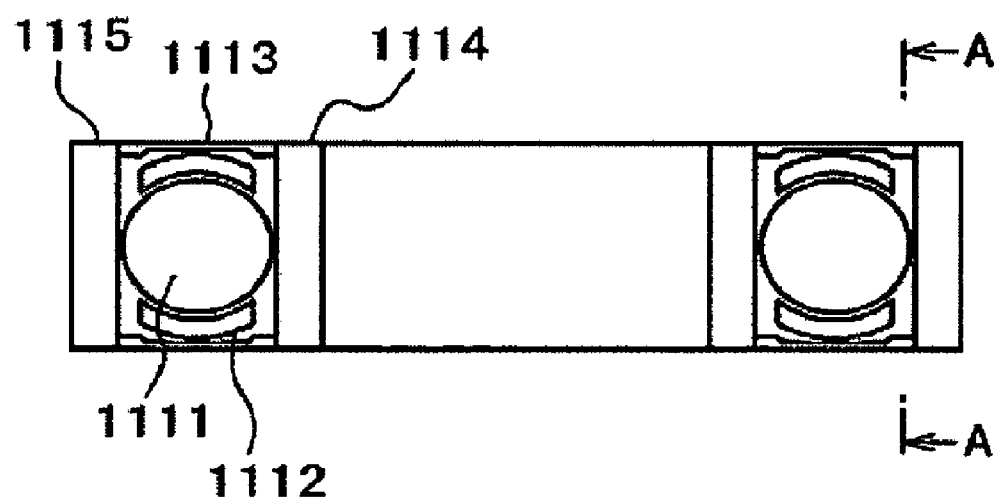
FIG. 9 is a sectional view showing the basic structure of the ball bearing.

FIG. 9 is a sectional view showing the basic structure of the ball bearing 111. There are provided a cylindrical outer ring 1115 and a cylindrical inner ring 1114 each formed of iron, stainless, or aluminum. A plurality of balls 1111 formed of iron, stainless, aluminum, or ceramics are interposed between the inner ring 1114 or the outer ring 1115 for rotation. Each space between the balls 1111 is held constant by a holder 1112 formed of iron, stainless, aluminum, or plastic. Grease 1116 (see FIG. 12) is filled between the balls 1111, the inner ring 1114 and the outer ring 1115 to provide smooth rotation. A shield 1113 formed of iron, stainless, aluminum, or plastic is provided to cover a portion of the holder 1112 ranging from the inner ring 1114 to the outer ring 1115 so that the grease is not scattered.

Figure 10:
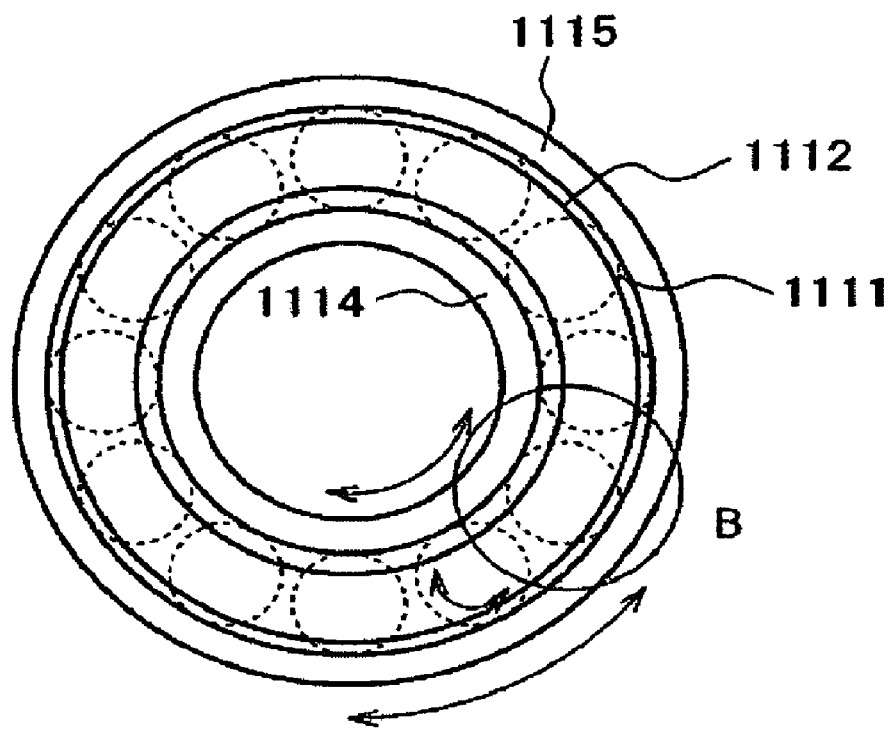
FIG. 10 is a top plan view of the ball bearing shown in FIG. 9.

FIG. 10 is a top plan view of the ball bearing 111. This is an example in which 12 balls 1111 are used. In the examples of FIGS. 6 and 7, since the inner ring 1114 is fixed to the center shaft 112, the outer ring 1115 rotates. In actual use, operation of the carriage rocks within a range of angle determined, and therefore, the outer ring 1115 and the balls 1111 are moved only within the range of angle determined.

Figure 11:
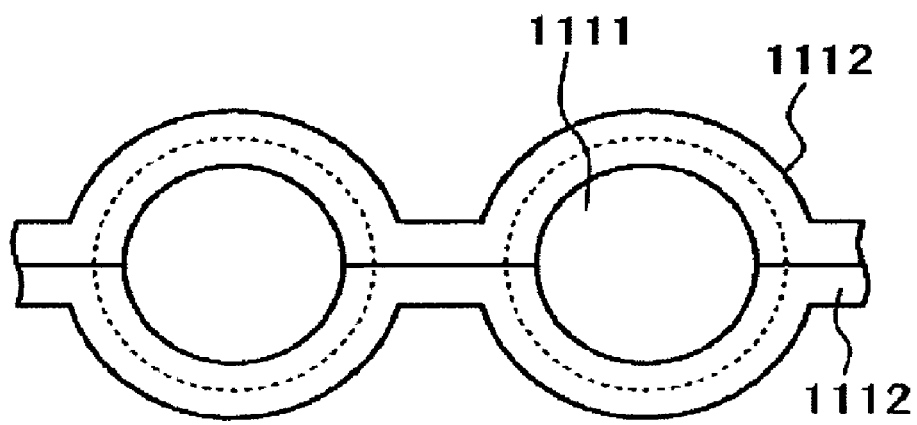
FIG. 11 is a side view of balls of the ball bearing and the holder shown in FIG. 9.
Figure 12:
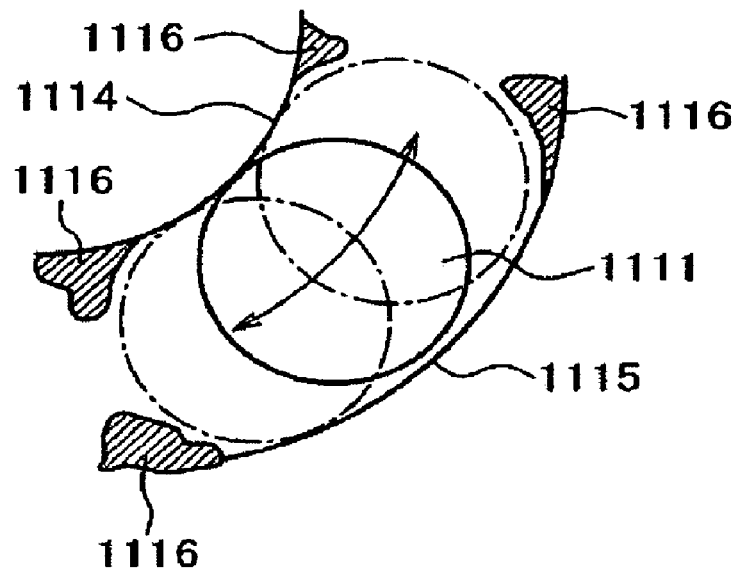
FIG. 12 is a view showing the state of grease at a low temperature of the ball bearing shown in FIG. 9.

FIG. 11 is a sectional view taken on line A-A of FIG. 9. Each space between the balls 1111 is held constant with the balls 1111 surrounded by the upper and lower holders 1112. FIG. 12 is an enlarged view of part B of FIG. 10, showing the phenomenon created when the conventional ball bearing 111 operates at a low temperature. In the environment at a low temperature, the viscosity of grease 1116 of the ball bearing 111 is large, wherein when the carriage rocks repeatedly in the range of a relatively small rotational angle, the grease 1116 in the rocking range becomes lean by the repeatedly passing balls 1111, and there occurs the phenomenon that a collected portion of the grease is moved closer to the turnback portion. If the carriage merely repeats the operation only in this range, no problem occurs. However, when the carriage operates over the allowable rocking range, the balls 1111 cross over the hill of the grease 1116. At this time, great resistance is generated with respect to the rotating force of the carriage.

Figure 13:
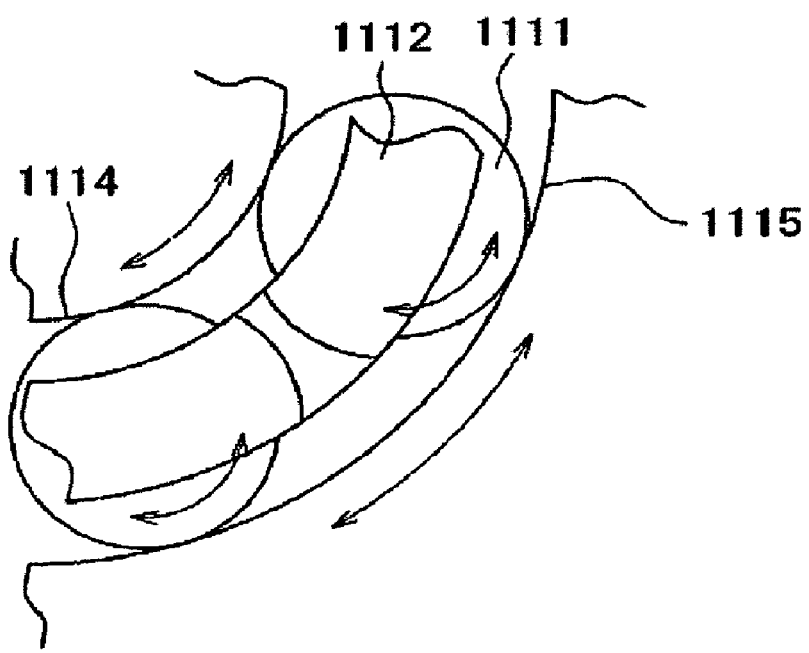
FIG. 13 is a top plan view showing operation of the ball bearing shown in FIG. 9.
Figure 1:
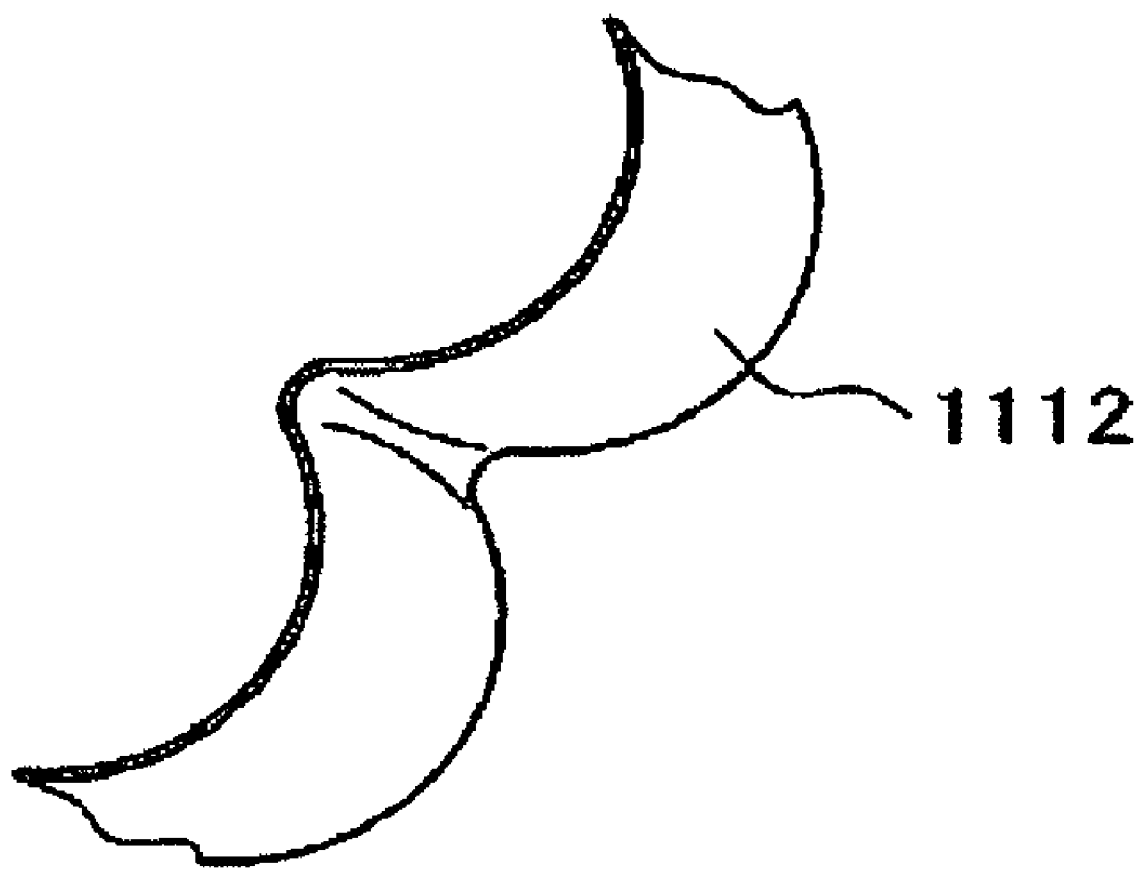

An HDD generally learns the external force generated with respect to the rocking of the carriage at fixed intervals, and sets a current value for energizing the coil 81 of a voice coil motor (VCM) used to move the carriage for rotation to a desired position. When the large resistance is generated in rotation of the carriage due to the aforementioned phenomenon, a current required therefor exceeds the current value set by the aforementioned learning. As a result, the rotation and movement of the carriage is not completed within the fixed time. The HDD issues an alarm indicating an abnormal state of time-out, resulting in stop or reckless run of the carriage. When rotation of the magnetic disk 13 stops in the state where the magnetic head 5 is above the magnetic disk 13, there is a serious trouble that the magnetic head 5 stops while being attracted on the magnetic disk 13. FIG. 13 is a detailed view of FIG. 10, showing a relationship between the inner ring 1114, the outer ring 1115, the balls 1111, and the holder 1112. FIG. 14 is a perspective view showing the shape of the holder 1112 of FIG. 13.

Figure 1:
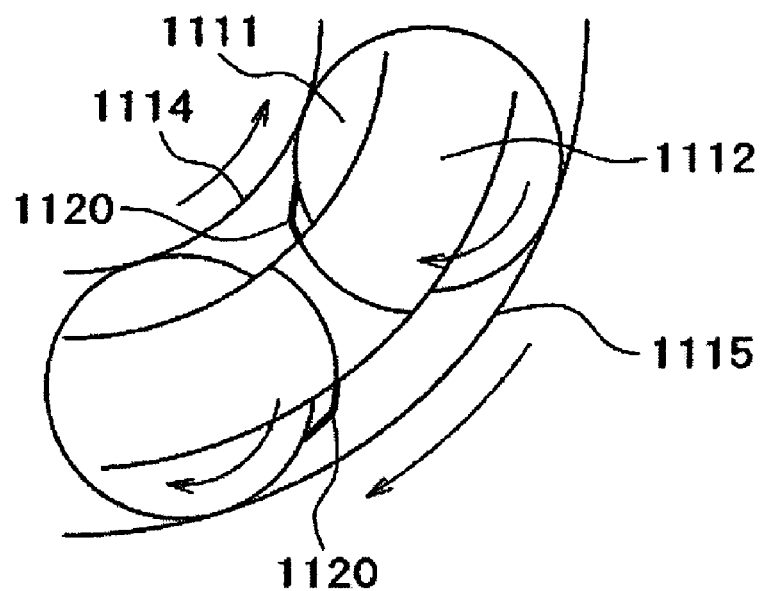
FIG. 1 is a top plan view showing a ball bearing according to a first embodiment of the present invention.
Figure 2:
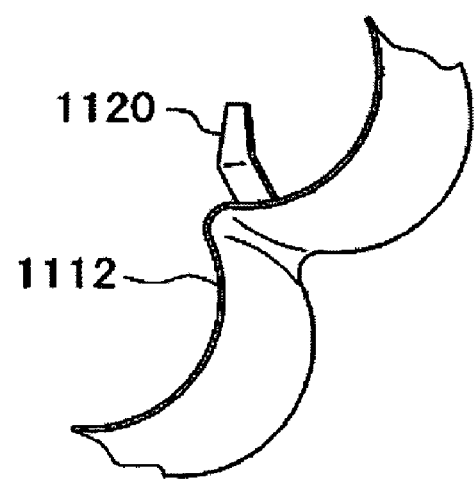
FIG. 2 is a partial perspective view of a holder according to the first embodiment of the present invention.

The embodiments of the present invention will be described hereinafter with reference to FIGS. 1 to 5. FIGS. 1 and 2 are views showing a first embodiment of the present invention. A holder 1112 is provided with a spring plate 1120 formed of iron, stainless, aluminum, or plastic. The spring plate 1120 is a mechanism that makes the balls 1111 hard to rotate in a specific direction. An extreme end of the spring plate 1120 is in the state always in contact with the balls 1111. The spring plate 1120 is made of a sufficiently softer material than the balls 1111 so as not to damage the balls 1111. The mounting direction is one along the direction in which the balls 1111 are desired to be rotated. Appropriate spring pressurization is applied to the balls 1111 at an angle defined by the spring plate 1120 and the holder 1112 in the root at which the spring plate 1120 is attached to the holder 1112, whereby even if wear is generated by the contact with the balls 1111, the spring pressurization is always applied to the balls 1111. It is noted that the spring plate 1120 may be integrally formed with the holder 1112.

In the case where the spring plate 1120 is arranged as shown in FIG. 1, when the outer ring 1115 rocks, the outer ring 1115 easily rotates in the direction where the balls 1111 rotate, as shown by the arrow. When the balls 1111 are rotated in the direction opposite the arrow direction, the resistance of the spring plate 1120 is applied to the balls 1111. Thus the outer ring 1115 is relatively hard to rotate. The rotating direction of the balls 1111 is a specific one direction, and the grease 1116 collected in the direction in which the balls 1111 rotate is easily returned to the original state when the carriage rotates in the opposite direction. Accordingly, there is no phenomenon that even during the operation at low temperature, the grease 1116 is collected to form the hill of grease, and therefore, the aforementioned problem is overcome. It is noted that two ball bearings 111 are provided on both ends of the rotational center shaft 112, and therefore, the direction of the carriage being hard to rotate is arranged in the opposite directions whereby the rotational resistance of the carriage can be made equal in any direction. Further, by using the above-described ball bearing, even when the HDD is placed on the transportation truck or the like and vibration is applied to the HDD, the balls rotate only in the determined direction. Therefore, the places at which the inner ring or the outer ring or both come in contact with the balls are different, making it possible to prevent fretting wear from occurring.

Figure 3:
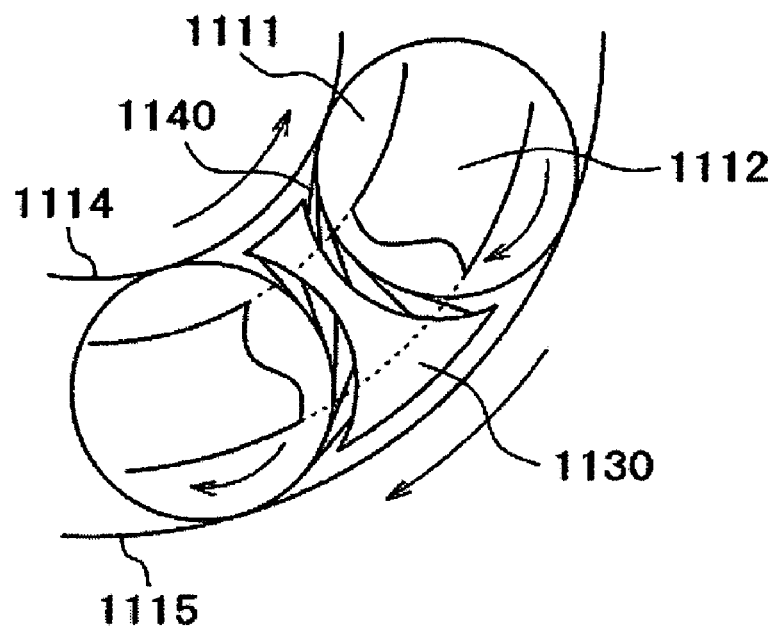
FIG. 3 is a top plan view showing a ball bearing according to a second embodiment of the present invention.
Figure 4:
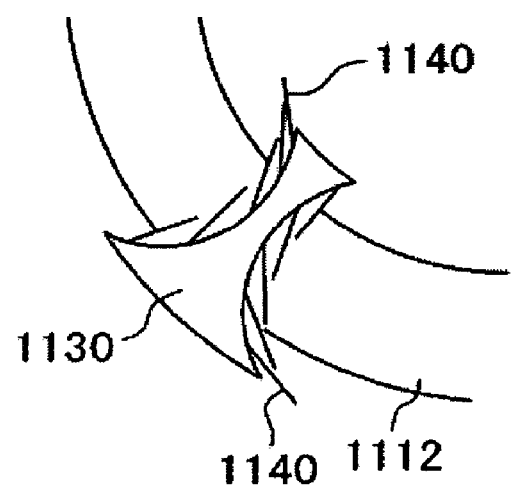
FIG. 4 is a top plan view of a holder according to the second embodiment of the present invention.
Figure 5:
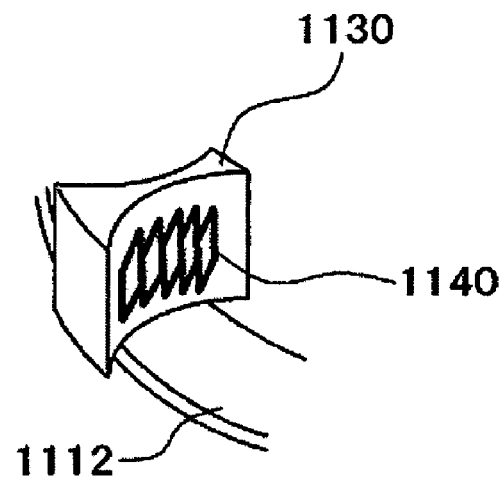
FIG. 5 is a partial perspective view of a holder according to the second embodiment of the present invention.

FIGS. 3 to 5 are views showing a second embodiment of the present invention. This embodiment is an example supposing that a material of the holder 1112 is plastic, in which a bush 1130 is provided between portions for holding the balls 1111 of the holder 1112. A plurality of spring plates 1140 are provided on the bush 1130. The spring plates 1140 each have the function similar to that of the aforementioned first embodiment as shown in FIGS. 1 and 2. An extreme end of the spring plate 1140 is in the state always placed in contact with the balls 1111. The spring plate 1140 is a sufficiently softer material than the balls 1111 so as not to damage the balls 1111. The mounting direction is one along the direction in which the balls 1111 are desired to be rotated. Appropriate spring pressurization is applied to the balls 1111 at an angle defined by the spring plate 1140 and the holder 1112 in the root at which the spring plate 1140 is attached to the holder 1112, whereby even if wear occurs due to the contact with the balls 1111, the spring pressurization is always applied to the balls 1111. It is noted that the bush 1130 may be integrally molded with the holder 1112.

Also in the second embodiment, the effect similar to that of the first embodiment may be obtained. However, in case of the second embodiment, since the plurality of spring plates 1140 are provided on the bush 1130, it is possible to make the balls 1111 harder to rotate in the specific direction than in the first embodiment.

The ball bearing 111 according to the above-described first and second embodiments may be also used for the bearing of the spindle motor 62 for rotating the magnetic disk 13. Where an HDD is placed on the transportation truck or the like and vibration is applied to the HDD, a relative position of the inner ring or the outer ring with the balls is always moved since the balls rotate only in the determined direction, thus enabling to avoid the problem of fretting wear.

As described above, according to the embodiments of the present invention, the balls of the ball bearing are made hard to rotate in a specific direction, whereby trouble of an HDD caused by increase in viscosity of grease when ball bearings operates at a low temperature can be prevented. Further, even when vibration is applied to an HDD, the problem of fretting wear can be avoided since a relative position of the ball with the inner ring or the outer ring is always moved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   an information storing magnetic disk;
   a spindle motor used for supporting said magnetic disk on a rotating shaft to rotate said magnetic disk;
   a magnetic head for recording or reproducing information on said magnetic disk;
   a pivot hub for supporting said magnetic head through a suspension;
   a rotational center shaft serving as the rotational center of said pivot hub; and
   a ball bearing provided between said rotational center shaft and said pivot hub and provided with a mechanism to make balls in the ball bearing hard to rotate in a specific direction, wherein the ball bearing is operable to rotate in the specific direction during operation of the magnetic disk drive while the mechanism is engaged with the ball bearing.

2. The magnetic disk drive according to claim 1, wherein said ball bearing has a holder that limits spaces defined by said balls, and said mechanism to make balls hard to rotate in a specific direction is provided on said holder, said mechanism being a spring plate to come into contact with said balls.

3. The magnetic disk drive according to claim 2, wherein said spring plate is formed of a material which is softer than said balls.

4. The magnetic disk drive according to claim 2, wherein said spring plate applies pressurization to said balls.

5. The magnetic disk drive according to claim 4, wherein said pressurization is applied to the balls at an angle defined by the spring plate and the holder in a root at which the spring plate is attached to the holder.

6. The magnetic disk drive according to claim 1, wherein said ball bearing has a holder that limits spaces defined by said balls, and said mechanism to make balls hard to rotate in a specific direction is provided on said holder, said mechanism being a bush having a plurality of spring plates to come into contact with said balls.

7. The magnetic disk drive according to claim 6, wherein said spring plates are formed of a material which is softer than said balls.

8. The magnetic disk drive according to claim 6, wherein said spring plates apply pressurization to said balls.

9. The magnetic disk drive according to claim 8, wherein said pressurization is applied to the balls at an angle defined by each spring plate and the holder in a root at which spring plate is attached to the holder.

10. A magnetic disk drive comprising:
    an information storing magnetic disk;
    a spindle motor used for supporting said magnetic disk on a rotating shaft to rotate said magnetic disk;
    a magnetic head for recording or reproducing information on said magnetic disk;
    a pivot hub for supporting said magnetic head through a suspension;
    a rotational center shaft serving as the rotational center of said pivot hub; and
    a ball bearing provided between said rotational center shaft and said pivot hub and provided with a mechanism to make balls in the ball bearing hard to rotate in a specific direction,
    wherein said ball bearings are provided on both ends of said rotational center shaft, and the direction in which said balls are hard to rotate is opposite for both ends of said rotational center shaft.

11. The disk drive device according to claim 10, wherein said ball bearing has a holder that limits spaces defined by said balls, and said mechanism to make a ball hard to rotate in a specific direction is provided on said holder, said mechanism being a spring plate to come into contact with said balls.

12. The magnetic disk drive according to claim 11, wherein said spring plate is formed of a material which is softer than said balls.

13. The magnetic disk drive according to claim 11, wherein said spring plate applies pressurization to said balls.

14. The magnetic disk drive according to claim 13, wherein said pressurization is applied to the balls at an angle defined by the spring plate and the holder in a root at which the spring plate is attached to the holder.

15. The disk drive device according to claim 10, wherein said ball bearing has a holder that limits spaces defined by said balls, and said mechanism to make balls hard to rotate in a specific direction is provided on said holder, said mechanism being a bush having a plurality of spring plates to come into contact with said balls.

16. A magnetic disk drive comprising:
 an information storing magnetic disk;
 a rotating shaft for supporting said magnetic disk;
 a fixed shaft serving as the rotational center of said rotating shaft;
 a ball bearing provided between said fixed shaft and said rotating shaft and provided with a mechanism to make balls hard to rotate in a specific direction; and
 a magnetic head for recording or reproducing information on said magnetic disk,
 wherein said ball bearing has a holder that limits spaces defined by said ball, and said mechanism to make balls hard to rotate in a specific direction is provided on said holder, said mechanism being a bush having a plurality of spring plates to come into contact with said balls.

17. The magnetic disk drive according to claim 16, wherein said spring plates are formed of a material which is softer than said balls.

18. The magnetic disk drive according to claim 16, wherein said spring plates apply pressurization to said balls.

19. The magnetic disk drive according to claim 18, wherein said pressurization is applied to the balls at an angle defined by each spring plate and the holder in a root at which the spring plate is attached to the holder.

20. The disk drive device according to claim 16, wherein said ball bearings are provided on both ends of said rotating shaft, and the direction in which said balls are hard to rotate is the same for both ends of said rotating shaft.

* * * * *